United States Patent [19]

Borofka

[11] Patent Number: 5,394,153
[45] Date of Patent: Feb. 28, 1995

[54] COMPRESSIVE RECEIVER HAVING A PLURALITY OF RF INPUTS

[75] Inventor: Robert P. Borofka, Granada Hills, Calif.

[73] Assignee: ITT Corporation, New York, N.Y.

[21] Appl. No.: 971,782

[22] Filed: Dec. 21, 1978

[51] Int. Cl.⁶ .............................................. G01S 7/40
[52] U.S. Cl. ..................................... 342/20; 342/192
[58] Field of Search ................ 343/100 LE, 113 R;
455/137, 139, 141, 146, 214, 226, 273, 276, 281;
324/77 C, 77 D; 342/13, 20, 192

[56] References Cited

U.S. PATENT DOCUMENTS

| | | |
|---|---|---|
| 2,954,465 | 9/1960 | White . |
| 2,955,199 | 10/1960 | Mindes . |
| 3,167,761 | 1/1965 | LeParquier ........................ 455/276 |
| 3,311,832 | 3/1967 | Schrader . |
| 4,079,318 | 3/1978 | Kinoshita . |
| 4,121,216 | 10/1978 | Bunch et al. ..................... 343/113 R |
| 4,131,852 | 12/1978 | Holland-Moritz .................. 455/226 |
| 4,162,497 | 7/1979 | Hullard et al. ............... 343/100 LE |

Primary Examiner—Gilberto Barrón, Jr.
Attorney, Agent, or Firm—Thomas N. Twomey; Patrick M. Hogan

[57] ABSTRACT

A compressive receiver of the type having a dispersive delay line is provided by an additional mixer which is responsive to the compressive receiver's local. oscillator and to an additional RF input. The output of the additional mixer is delayed and applied to the input of the dispersive delay line. The output of the dispersive delay line is divided, one of the divided outputs being delayed. The delayed output and the other dividend output are compared in a comparison circuit. The compressive receiver may be advantageously used as a direction finding or side lode cancelling compressive receiver.

14 Claims, 3 Drawing Sheets

FIG. 1 COMPRESSIVE RECEIVER (PRIOR ART)

COMPRESSIVE RECEIVER HAVING A PLURALITY OF RF INPUTS

BACKGROUND OF THE INVENTION

The invention relates to the direction finding techniques for use with compressive receivers.

Direction finding techniques used with conventional radio systems are well known in the art. For example, see "Radio Engineer's Handbook" by F. E. Terman published 1943 starting at page 872. Additionally, compressive receivers are well known in the art, as exemplified by U.S. Pat. No. 2,882,395. Typical prior art direction finding equipment employs two or more receivers which are carefully designed so that each of the receivers used in the direction finding equipment has uniform amplitude and phase shift characteristics. However, substituting compressive receivers for the conventional receivers used in direction finding equipment presents a major drawback in that the dispersive delay line employed in the compressive receivers need be ideally balanced to achieve meaningful results. Such balanced dispersive channels would be very difficult to achieve.

It was therefore one object of the present invention that a direction finding compressive receiver be provided which is insensitive to the lack of channel balance typically imposed by a pair of dispersive channels.

It is yet another object of this invention to provide a direction finding compressive receiver which employs but one dispersive channel.

It is still another object of this invention that a direction finding compressive receiver be comparable to at least two antenna for direction finding purposes yet require but one dispersive delay line channel.

It is still yet another object of this invention to provide a direction finding compressive receiver of simpler construction than those which might be suggested by the prior art.

The foregoing objects are achieved as is now described. A direction finding compressive receiver is provided with outputs from at least two antennas. The antenna outputs are applied to separate mixers which also receive the output from a common swept local oscillator. The outputs of the mixers are selectively delayed prior to being connected in common to the input to a dispersive delay line. The output of the delay line is coupled to the inputs of a comparison circuit, at least one of the inputs being coupled via another delay line.

The advantage of the invention both as to its construction and mode of operation, in the prefered mode of use, will be readily appreciated by reference to the following detailed description when considered in connection with the accompanying drawings in which like reference numerals refer to like parts throughout the drawings.

DESCRIPTION OF THE PREFERRED EMBODIMENTS

Figure 1:
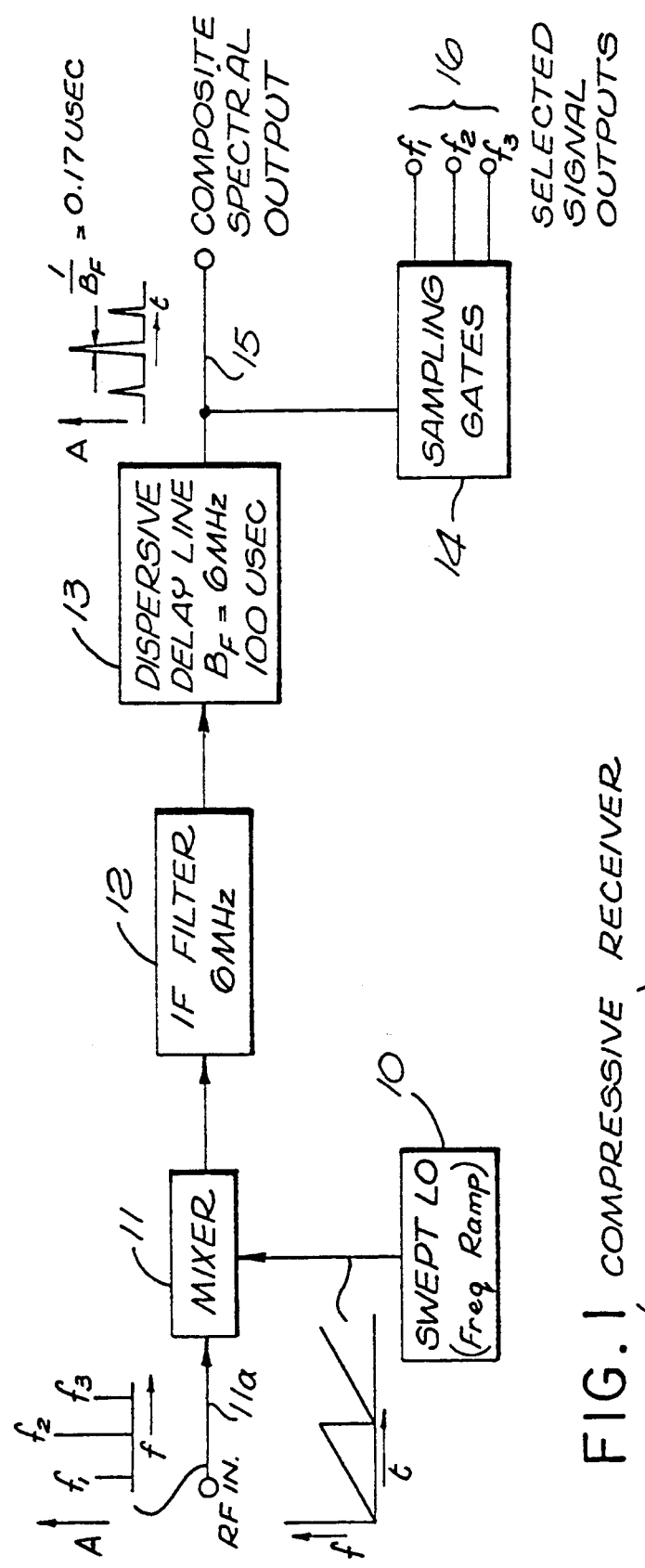
FIG. 1 is a block diagram of a compressive receiver of the type known in the prior art.

In FIG. 1, a typical compressive receiver configuration is depicted. This compressive receiver is basically a superheterodyne circuit analogous, up to the dispersive filter, to a conventional scanning superheterodyne. A mixer 11 responds to the signals within a predetermined frequency band, which may encompass, for example, the three signals labelled $f_1$, $f_2$, and $f_3$ as shown at input 11A. A high-speed frequency ramp is provided by swept local oscillator 10. The frequency ramp provided at output of local oscillator 10 is applied to mixer 11 which produces a set of signals in the Intermediate Frequency (IF) domain at the output of mixer 11 corresponding to $f_1$, $f_2$ and $f_3$ at the input 11A.

The dispersive delay line 13 which, in the example shown in FIG. 1, has a 6 MHz band width and a 100 microsecond dispersion, defined the required scan rate produced in local oscillator 10. If the difference frequency generated by mixing the scanning local oscillator frequency with the input signal 11A frequency in mixer 11 is made to scan across the IF band width at a time equal to the delay line dispersion, then all the energy of each frequency modulated signal at the input to the delay line 13 comes out of a delay line 13 as an impulse. The shape of this time response will be the impulse response of the IF filter.

If full sensitivity is to be maintained in a conventional scanning receiver, its scan speed is limited by its resolution. The compressive receiver, on the other hand, as compared to the conventional scanning receiver, overcomes this restriction by placing a local frequency modulated "coding" on the received signal through the use of a high-speed linearly-scanned local oscillator. This code is matched to the dispersive delay line 13 in FIG. 1. Thus the compressive receiver local oscillator and delay line may be thought of as forming a matched filter pair. The output of the delay line therefore comprises a compressed pulse whose time position with respect to the receiver scan are directly related to the frequency of the signal at the receiver input 11A.

It should be noted that mixer image frequencies, which are generated by typical mixers 11 inasmuch as both sums and differences of the local oscillator and input frequency are outputted from mixer 11, are frequency modulated in the opposite direction from each other; therefore, only one is properly matched to the delay line. Consequently, the non-matched image frequency does not contribute a significant output from the compressive receiver.

The duration of the compressed pulse emerging from the delay line is approximately equal to the reciprocal of the delay line band width. If this band width is, for example, 6 MHz, as illustrated in connection with FIG. 1, the duration of the output pulse will be small, for example, about 0.17 microseconds and the frequency resolution is correspondingly high. The frequency resolution is approximately equal to the reciprocal of the dispersion of the delay line. For the dispersion of 100 microseconds, for example, the ideal frequency resolution is 10 KHz.

To produce the matched filter effect desired, as aforementioned, the frequency vs. time dispersion of the delay line preferably is the same as the sweep speed of the local oscillator. If these conditions are satisfied, substantially all of the signal energy in the IF sweep pulse entering the delay line will emerge at the output at nearly the same instant of time. From this it will be realized that the requirement for linearity and repeatability on the frequency ramp, which is outputted from the swept local oscillator 10, is stringent if the matched pair relationship aforementioned, vis-a-vis the dispersive delay line 13, is to be met and preserved. The output of the dispersive delay line 13 providing the pulses as aforementioned is depicted at the composite spectral, output 15. One technique for assuring the linearity and repeatability of the frequency ramp outputted by local oscillator 10 is described in U.S. Pat. No. 4,038,612 which issued Jul. 26, 1977 and which is assigned to the same assignee as the present invention.

Figure 2:
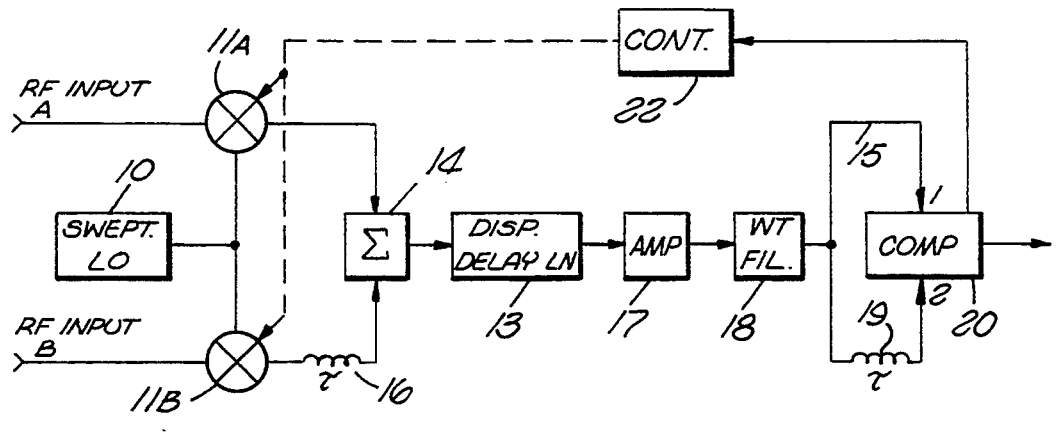
FIG. 2 is a block diagram of one embodiment of a compressive receiver embodying by direction finding technique.

Conventional direction finding apparatus typically employ two or more antennas and the circuitry for comparing the amplitude and/or phase of the RF signals received from the two or more antennas. In FIG. 2, two antennas are used to provide RF inputs to the direction finding compressive receiver of FIG. 2. These inputs are labelled RF Input A and B and are respectively coupled to mixers 11A and 11B which also receive a common output from the swept local oscillator 10. The outputs of mixers 11A and 11B are combined at block 14 after one channel is slightly delayed by delay element 16. The delay associated with element 16 is approximately two times the width of the impulse expected out of dispersive delay line 13. The delay of element 16 is denoted by $\tau$. The output of block 14 is applied to dispersive delay line 13 which is preferably coupled via an amplifier 17 and a weighted filter 18 to a comparator 20. The output 15 received from dispersive delay line 13 is preferably split before being applied to comparator 20, one of the split outputs preferably being directly applied to comparator 20 and the other output being applied via a delay element 19, also preferably having a delay $\tau$ associated therewith.

In FIG. 1, amplifier 17 and weighted filter 18 were not specifically shown but may be used therewith if desired. Weighted filter 18 may be used, if desired, to reduce side lobes otherwise occuring in the time response at output 15. Side lobes tend to limit resolution when the relative magnitudes of received signals are large. Conventional weighted filters would include filters employing Hamming or Taylor weighting functions. Not specifically shown in FIG. 2 is the IF filter 12 of FIG. 1, which IF filter is preferably inserted between block 14 and delay line 13, but, which alternatively may be inserted as two separate IF filters between respective mixers 11A and 11B and the inputs at block 14.

Figure 3:
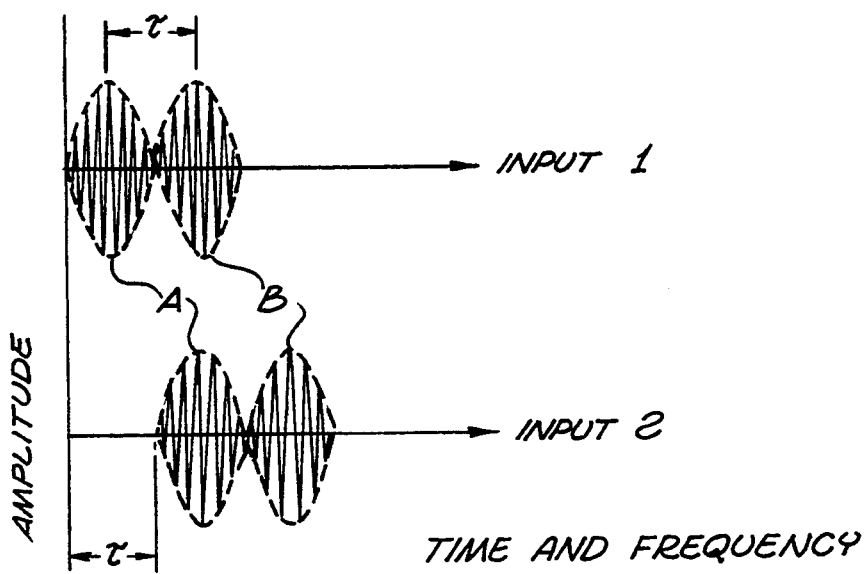
FIG. 3 depicts the signal waveforms available at the comparator of FIG. 2.

Referring now to FIG. 3, there is shown the output 15 which is directly applied to comparator 20 at Input 1 thereof. This signal, labelled "Input 1" contains two pulses labelled A and B respectively. The time separation between them is equivalent to $\tau$, the delay of element 16. Thus when a single radio frequency source is detected at RF Inputs A and B of the compressor receiver of FIG. 2, two resulting FM waveforms A and B are overlapped, one of which is delayed by $\tau$. The combined signals are fed into the dispersive delay line 13 which provides two distinct pulses, shown as A and B in FIG. 3, one for each channel. Amplitude is preserved through the system. At the output 15, the output is split into two inputs to comparator 20, and, as aforementioned, one of the outputs is delayed by $\tau$ at element 19. The output from element 19 is applied to Input 2 of comparator 20 and depicted by the signal labelled "Input 2" in FIG. 3. As can be now easily seen in FIG. 3, by performing an amplitude comparison, or phase comparison or a combination thereof on the A and B signals during the time they overlap at Inputs 1 and 2, the receiver can perform a conventional direction-finding analysis based on the RF inputs A and B received.

It should be noted that both delay elements 16 and 19 are relatively short and cover the band width of the dispersive delay line 13, thus conventional delay lines may be used therefor. For a VHF receiver similar to that depicted in FIG. 1, having a dispersive delay line with a band width of 6 MHz, then $\tau$ for delay lines 16 and 19 could be 0.35 microseconds at a center frequency of 15 MHz. Such delay lines are readily constructable or obtainable.

This invention uses one swept local oscillator and a single dispersive delay line to service the input channels in an effective time sharing manner without requirement for any switching. It is not necessary to used balanced dispersive channels to achieve a direction finding compressive receiver, which balance dispersive channels would be very difficult to achieve. Of course, channel balance of the two front end channels through mixers 11A and 11B is required in this design; however, this is readily achievable since such balanced input channels are used in conventional scanning superheterodyne direction finding apparatus. If desired, a transfer switch may be connected between the RF inputs and mixers to allow cancellation of any unbalance.

Preferably, the compressive receiver shown in FIG. 2 is used as a direction finding apparatus. However, an alternate use for this invention is for side lobe cancelling. For example, if channel A is connected to a directional antenna and channel B is connected to an omni-directional antenna, then the channel A receiver output would be used only if it was greater than that obtained for channel B.

Figure 4:
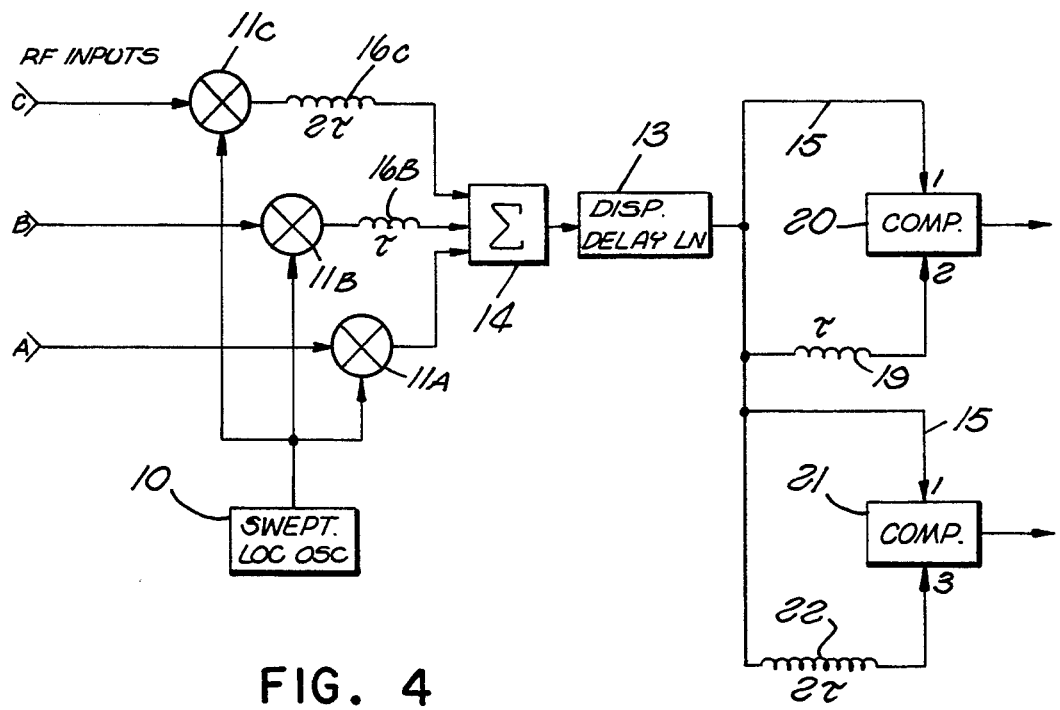
FIG. 4 is a block diagram of another embodiment of a compressive receiver utilizing the present invention.
Figure 5:
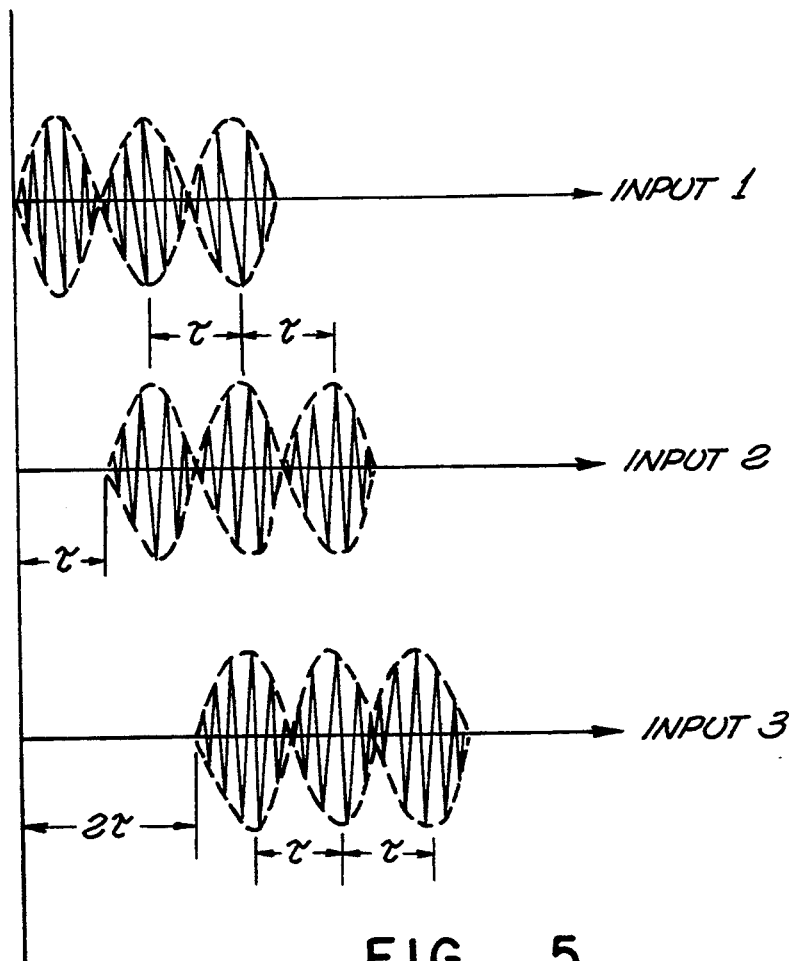
FIG. 5 depicts the waveforms available at the comparators depicted in FIG. 4.

Referring now to FIGS. 4 and 5, there is shown an alternate embodiment of a compressive receiver employing the present invention. In FIG. 4, the compressive receiver is provided with three RF inputs A, B and C. RF input B is delayed by $\tau$ whereas RF input C is delayed by $2\tau$. Similarly at the output, two comparison circuits 20 and 21 are provided one of which has an input delayed by $\tau$ and the other which has an input delayed by $2\tau$. Thus, as can be seen from FIG. 5, it is possible to compare the outputs corresponding to inputs A and C at comparator 21 at the same time that the outputs corresponding to inputs A and B are being compared at comparator 20. This design would be useful, for example, with direction finding apparatus employing two directional antennas and one omni-directional antenna. Thus, for example, the two directional antennas (e.g., loop antennas) could be coupled to RF inputs B and C while the omni-directional antenna could be coupled to RF input A. Then by comparing waveforms A and B in comparator 20, either by frequency or amplitude or a combination of the two analyses, the bearing angle to the radio frequency source could be determined and by performing a comparison between signals A and C in comparator 21, direction sense information could be added to the determined bearing angle information. For a further discussion of direction finding techniques, reference should be had to the aforementioned Radio Engineer's Handbook.

One disadvantage of this concept is that the second output (in the case of the embodiment of FIG. 2) and the second and third outputs (in the case of the embodiment of FIG. 4) of the dispersive display line could also be due to a signal at a slightly different RF frequency. Thus, the two impulses outputted at output 15 could provide confusion in comparator 20 (and comparator 21 for that matter) due to the fact it would not be immediately apparent whether waveform B (and C) were merely delayed versions of waveform A received on separate channels or were separate RF frequency sources. However, this drawback is easily overcome by momentarily disabling all but one of the RF input channels, for example by disabling the mixers associated therewith. Thus by momentarily switching to single channel operation it can easily be determined whether the signal at waveform B is attributable to merely a delayed signal coming via another input or whether it is attributable to another RF source. Referring again, to FIG. 2, comparator 20 is preferably coupled to a controller 22 for disabling one or both mixers 11A and 11B. For example, controller 22 may be arranged to either disable one of the predetermined mixers 11A or 11B or, alternatively, may select the mixer 11A or 11B which is receiving the weakest RF signal. While RF inputs A or B are being disabled by application of a control signal to at least one of mixers 11A or 11B, it will be appreciated by those skilled in the art that this function may be obtained by other means, including disabling the RF input to the mixer concerned, or disabling the local oscillator's input to the mixer concerned or disabling the output from the mixer concerned. The control signal for performing this disabling function is generated by controller 22.

Having described the invention with respect to certain preferred embodiments thereof, modification will now suggest itself to those skilled in the art. For example, it should be apparent to those skilled in the art that in lieu of connecting delay element 16 (FIG. 2) to the output of mixer 11B, that delay element could alternatively be coupled to the inputs of mixer 11B. Similarly, it should be apparent that delay elements, such as elements 16 and 19, may be used in all channels of the receiver so long as the channels have different delay periods associated therewith. Furthermore, although a CRT type display will often be coupled to the output of comparator 20, other display equipment capable of human observation or, in some applications, automatic control equipment may alternatively be coupled to the output of comparator 20. The invention itself is not to be limited to the specific embodiments described, except as set forth in the appended claims.

What is claimed is:

1. A compressive receiver comprising:
   a. at least two radio frequency inputs;
   b. a swept local oscillator;
   c. at least two mixers, one of said at least two mixers being responsive to the output of said local oscillator and one of said at least two radio frequency inputs, the other of said at least two mixers being responsive to the output of said local oscillator and to another of said radio frequency inputs;
   d. a dispersive delay line;
   e. means for coupling the outputs of said at least two mixers to an input of said dispersive delay line;
   f. a comparator circuit having at least two inputs; and
   g. means for coupling the output of said delay line to the inputs of said comparator circuit and for delaying the output of said dispersive delay line before coupling to at least one of the inputs of said comparator circuit.

2. The compressive receiver according to claim 1, further including means for delaying the output of said one of said at least two mixers before being coupled to the input of said dispersive delay line.

3. The compressive receiver according to claims 1 or 2, further including a controller circuit for selectively disabling at least one of the at least two signals applied to said input of dispersive delay line.

4. The compressive receiver according to claim 3, wherein said controller is responsive to said comparator circuit.

5. An electric circuit comprising:
   a. at least two high frequency sources;
   b. a swept local oscillator;
   c. means for mixing the output of said local oscillator and said at least two high frequency sources;
   d. means for dispersively delaying signals;
   e. means for coupling the signals mixed by said means for mixing to said means for dispersively delaying signals and for delaying at least a portion of the signals mixed by said means for mixing before coupling to said means for dispersively delaying signals.

6. The circuit as defined by claim 5, further including:
   a. a comparison circuit; and
   b. means for coupling the signals outputed by said means for dispersively delaying signals to said comparison circuit and for delaying at least a portion of the signals outputed by said means for dispersively delaying signals before coupling to said comparison circuit.

7. The circuit as defined by claim 6, further including means for disabling at least one of the signals mixed by said means for mixing, said means for disabling being responsive to said comparison circuit.

8. A method of processing at least two radio frequency signals received by compressive receiver, said method comprising steps of:
   a. generating a frequency ramp;
   b. mixing said at least one of said at least two radio frequency signals and the frequency ramp;
   c. mixing another of the at least two radio frequency signals and the frequency ramp;
   d. delaying at least one of the signals outputted from the mixing steps;
   e. combining the results of the mixing steps;
   f. dispersively delaying the results of the combining step in the dispersive delay line; and
   g. completing signals occurring at a output of said delay line, said signals, being separated in time by the amount of delay inserted by the delaying step.

9. The method according to claim 8, wherein the delay imposed by the step of delaying said at least one of said at least two radio frequency signals is the same as the delay imposed by the step of delaying said at least one of said at least two output signals.

10. The method according to claim 8, wherein the step of comparing said at least one of said at least two output signals with said another of said at least two output signals is accomplished by comparing the phase relationship of the aforementioned output signals.

11. The method according to claim 8, wherein the step of comparing said at least one of said at least two output signals with said another of said at least two output signals is accomplished by comparing the amplitude of the aforementioned output signals.

12. In a compressive receiver of the type having a swept local oscillator, a mixer responsive to the output of the swept local oscillator and to an inputed RF signal, and a single dispersive delay line responsive to signals outputted from the mixer, the improvement comprising a second mixer responsive to the output of the swept local oscillator and to a second inputted RF signal and means for coupling the output of said second mixer to said single dispersive delay line.

13. The compressive receiver according to claim 12, wherein said means for coupling the output of said second mixer to said single dispersive delay line includes a delay element.

14. The compressive receiver according to claim 13, further including a comparison circuit coupled to receive two outputs from said single dispersive delay line, one of said two outputs being delayed with respect to the other of said two outputs.

* * * * *